United States Patent
Greenwood et al.

(10) Patent No.: US 9,238,423 B2
(45) Date of Patent: Jan. 19, 2016

(54) WALL RAIL PLATFORM AND SYSTEM

(71) Applicant: Black Mountain Industries, Inc., Bryan, TX (US)

(72) Inventors: Kyle L. Greenwood, Bryan, TX (US); Rattaya C. Yalamanchili, Houston, TX (US)

(73) Assignee: Black Mountain Industries, Inc., Bryan, TX (US)

( * ) Notice: Subject to any disclaimer, the term of this patent is extended or adjusted under 35 U.S.C. 154(b) by 149 days.

(21) Appl. No.: 13/735,842

(22) Filed: Jan. 7, 2013

(65) Prior Publication Data

US 2014/0021761 A1    Jan. 23, 2014

Related U.S. Application Data

(60) Provisional application No. 61/584,172, filed on Jan. 6, 2012.

(51) Int. Cl.
| | |
|---|---|
| *B60N 2/015* | (2006.01) |
| *B60N 2/04* | (2006.01) |
| *B60N 2/06* | (2006.01) |
| *B60N 2/14* | (2006.01) |
| *B60N 2/16* | (2006.01) |
| *B60N 3/06* | (2006.01) |
| *B60N 2/24* | (2006.01) |
| *B60N 2/42* | (2006.01) |

(52) U.S. Cl.
CPC *B60N 2/16* (2013.01); *B60N 2/062* (2013.01); *B60N 2/24* (2013.01); *B60N 2/4242* (2013.01); *B60N 3/063* (2013.01)

(58) Field of Classification Search
CPC .......... B60N 2/16; B60N 2/163; B60N 2/062; B60N 2/4242; B60N 3/063; B60N 2/24
USPC .............. 297/339, 217.7, 344.18, 14, 344.12, 297/344.13; 248/188.2
See application file for complete search history.

(56) References Cited

U.S. PATENT DOCUMENTS

| | | | | |
|---|---|---|---|---|
| 2,937,692 | A * | 5/1960 | McMichael, Jr. ............. | 248/244 |
| 3,428,976 | A * | 2/1969 | Robinson ....................... | 114/363 |
| 3,625,563 | A * | 12/1971 | Dickinson et al. ............ | 297/333 |
| 4,555,138 | A * | 11/1985 | Hughes ..................... | 297/344.13 |
| 4,889,389 | A * | 12/1989 | White et al. .................. | 297/468 |
| 5,516,179 | A * | 5/1996 | Tidwell .......................... | 296/63 |
| 5,746,465 | A * | 5/1998 | Jones et al. ................. | 296/65.03 |
| 6,189,843 | B1 * | 2/2001 | Pfister .......................... | 248/161 |
| 6,267,071 | B1 * | 7/2001 | Ellis .............................. | 114/363 |
| 7,100,991 | B2 * | 9/2006 | Schroth ........................ | 297/468 |
| 7,413,247 | B2 * | 8/2008 | Van Druff et al. ....... | 297/216.17 |
| 8,109,563 | B2 * | 2/2012 | Hansen ......................... | 297/14 |
| 2002/0149249 | A1 * | 10/2002 | Horn ........................ | 297/344.12 |
| 2005/0093357 | A1 * | 5/2005 | Takeda et al. ................ | 297/353 |
| 2010/0084534 | A1 * | 4/2010 | Greenwood ................. | 248/404 |
| 2010/0084897 | A1 * | 4/2010 | Greenwood ............... | 297/217.7 |

* cited by examiner

*Primary Examiner* — Milton Nelson, Jr.
(74) *Attorney, Agent, or Firm* — Tumey L.L.P.

(57) ABSTRACT

A system and method allow for a platform to be collapsed and moved in a vehicle. In one embodiment, a wall rail platform system disposed in a vehicle includes a collapsible platform. The collapsible platform has a position, which is a collapsed position or an un-collapsed position. The system also includes a rail and a carriage. The carriage is attached to the collapsible platform. The carriage is vertically moveable along the rail.

17 Claims, 14 Drawing Sheets

WALL RAIL PLATFORM AND SYSTEM

CROSS-REFERENCE TO RELATED APPLICATIONS

This application is a non-provisional of U.S. application Ser. No. 61/584,172 filed Jan. 6, 2012, which is herein incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of vehicle occupant support systems and more specifically to soldier support systems in a vehicle.

2. Background of the Invention

Occupants of vehicles often need to be in an elevated position within the vehicle. For instance, in military vehicles, occupants of the military vehicles may need to expose the upper portion of the occupants' bodies outside of the vehicle. Such instances include the need to operate weaponry, improve vision outside of the military vehicle, and the like. Problems occur in such situations with fatigue involved with the individuals having to stand in such positions for long periods of time. Further problems include securing the occupant inside the vehicle during motion of the vehicle and also during a vehicle roll over to prevent injury of the occupant.

Platforms have been developed on which the occupants may stand to overcome some of such drawbacks. However, such platforms have drawbacks, which include inefficient use of space in the vehicle when the platform is not being used. Further drawbacks include inefficient placement or inability to adjust the location of the platforms within the vehicle.

Consequently, there is a need for a system to protect soldiers in a vehicle. Additional needs include a system to support soldiers in a vehicle but that also optimizes use of available space in the vehicle.

BRIEF SUMMARY OF SOME OF THE PREFERRED EMBODIMENTS

These and other needs in the art are addressed in one embodiment by a wall rail platform system disposed in a vehicle. The wall rail platform system includes a collapsible platform. The collapsible platform includes a position, wherein the position comprises a collapsed position or an un-collapsed position. In addition, the wall rail platform system includes a rail and a carriage. The carriage is attached to the collapsible platform. The carriage is vertically moveable along the rail.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
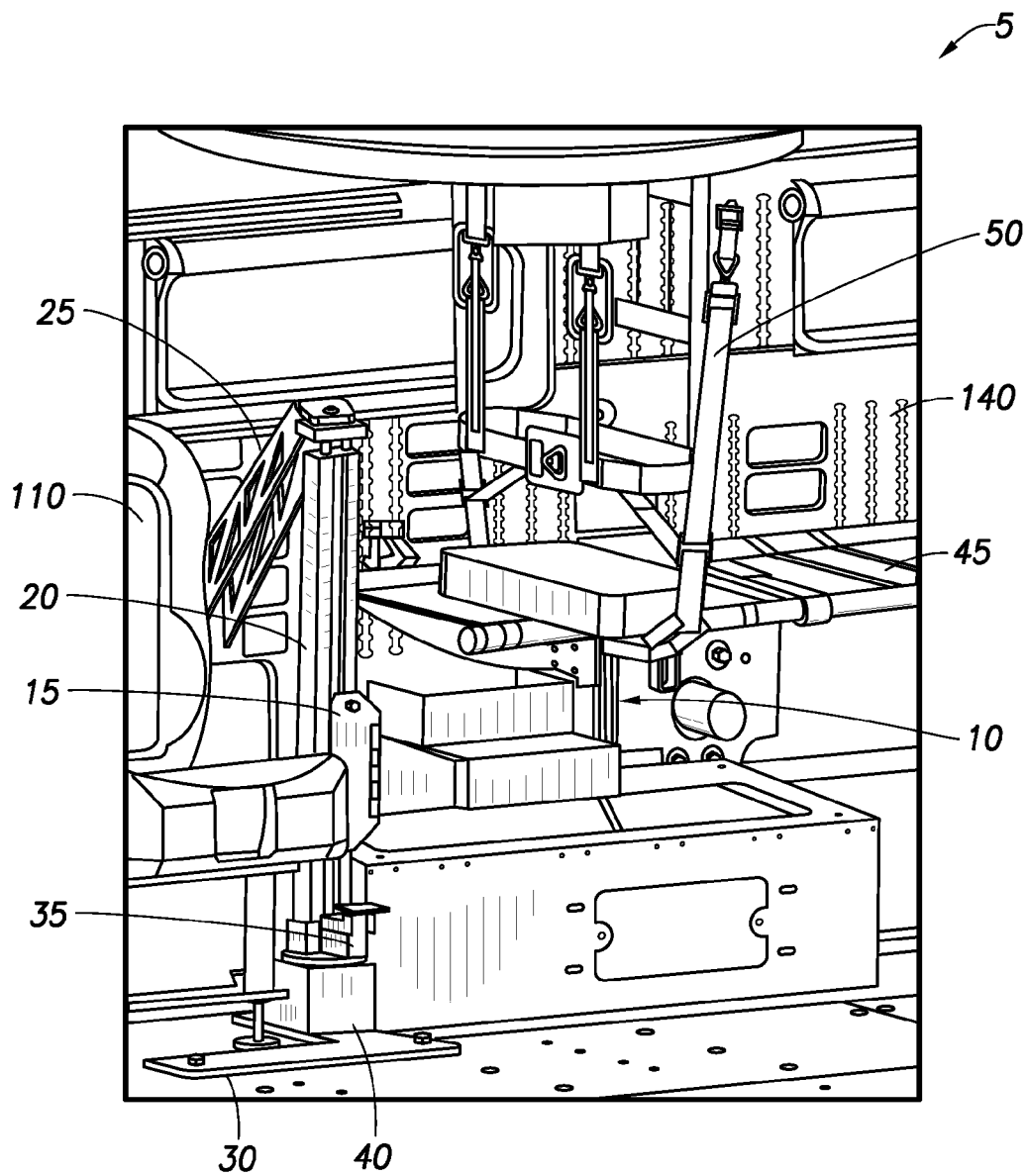
FIG. 1 illustrates a perspective view of an embodiment of a wall rail platform system having a collapsible platform.
Figure 2:
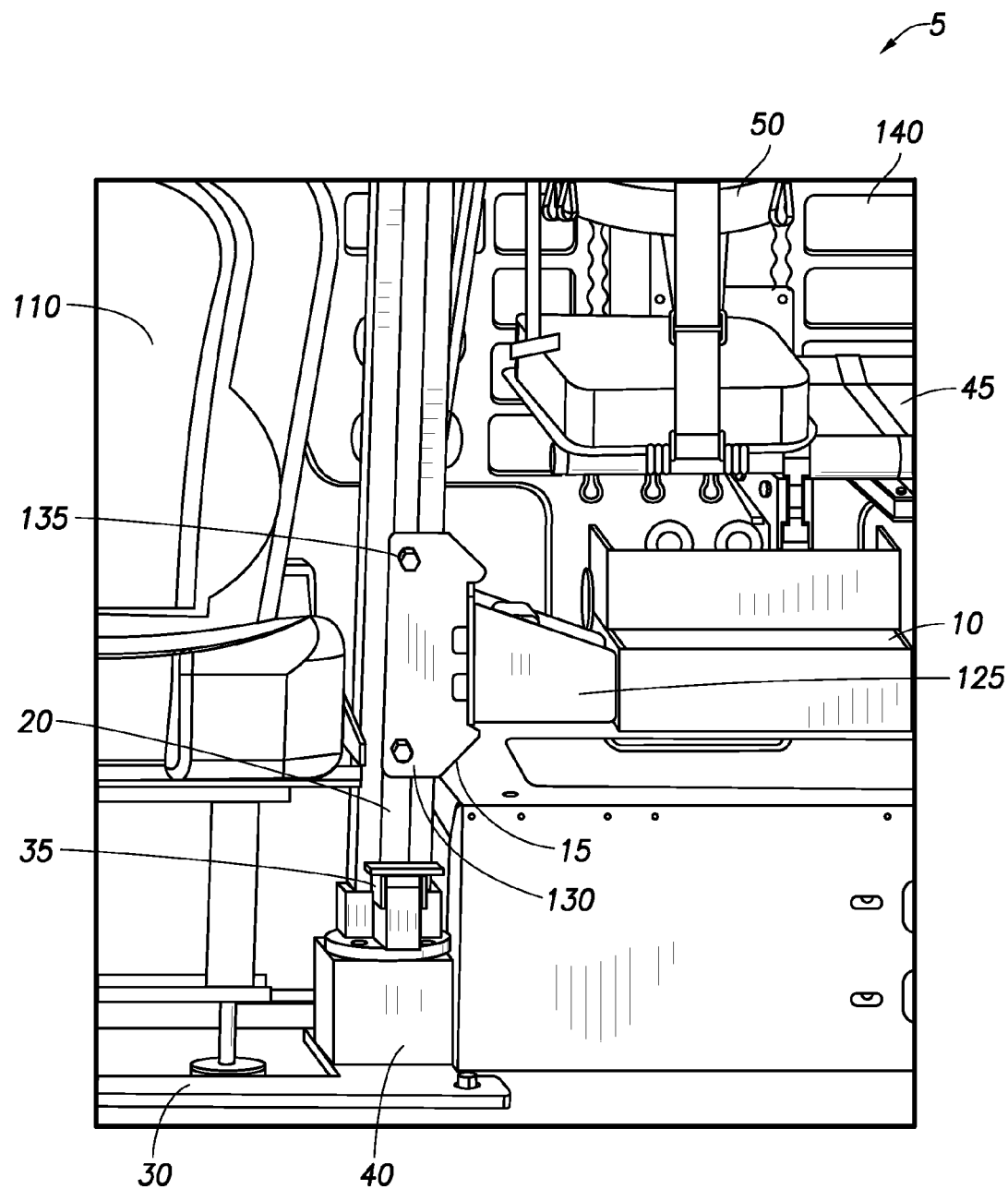
FIG. 2 illustrates another perspective view of an embodiment of a wall rail platform system having a collapsible platform.
Figure 3:
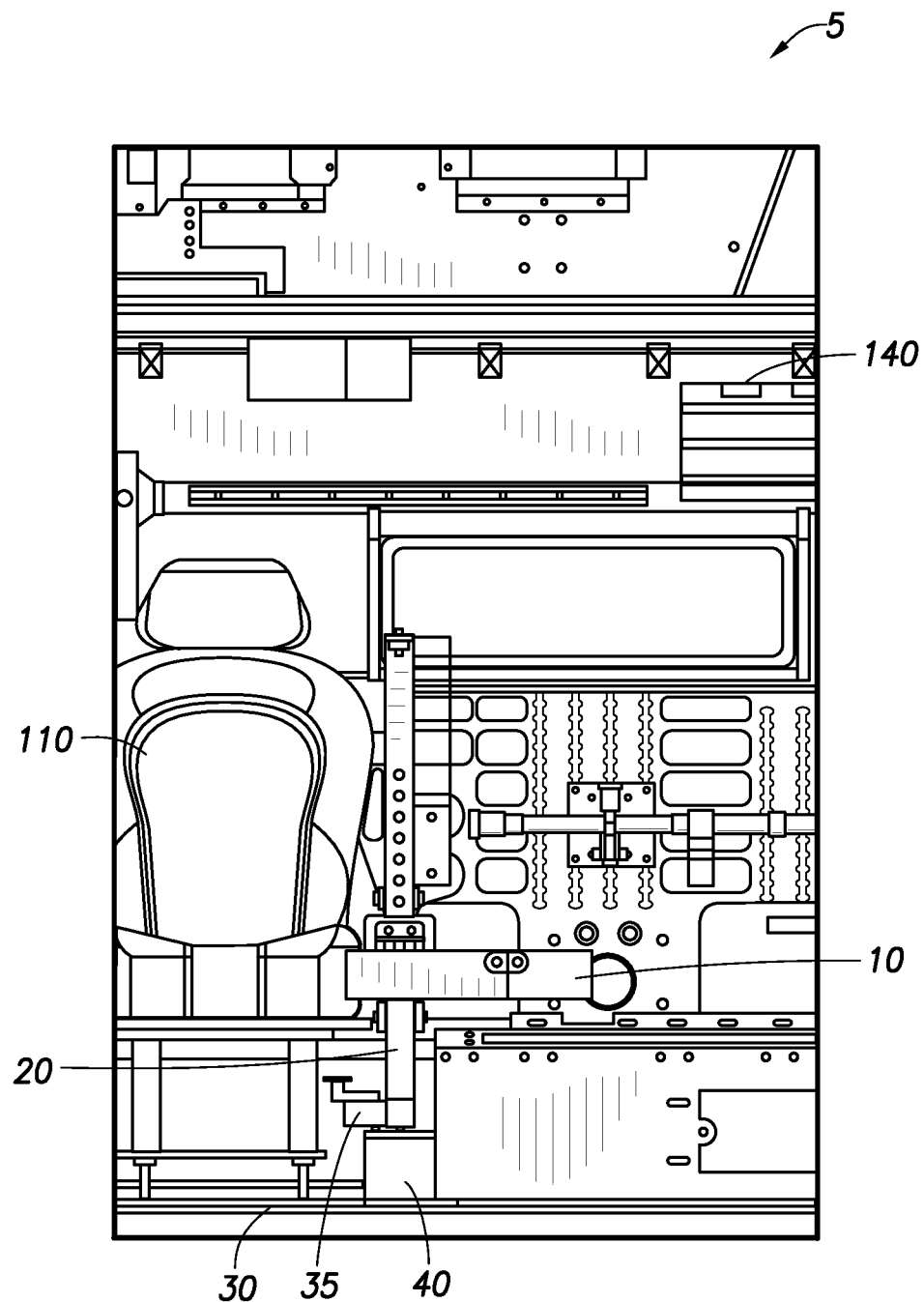
FIG. 3 illustrates a front view of an embodiment of a wall rail platform system having a collapsible platform in a lower position.
Figure 4:
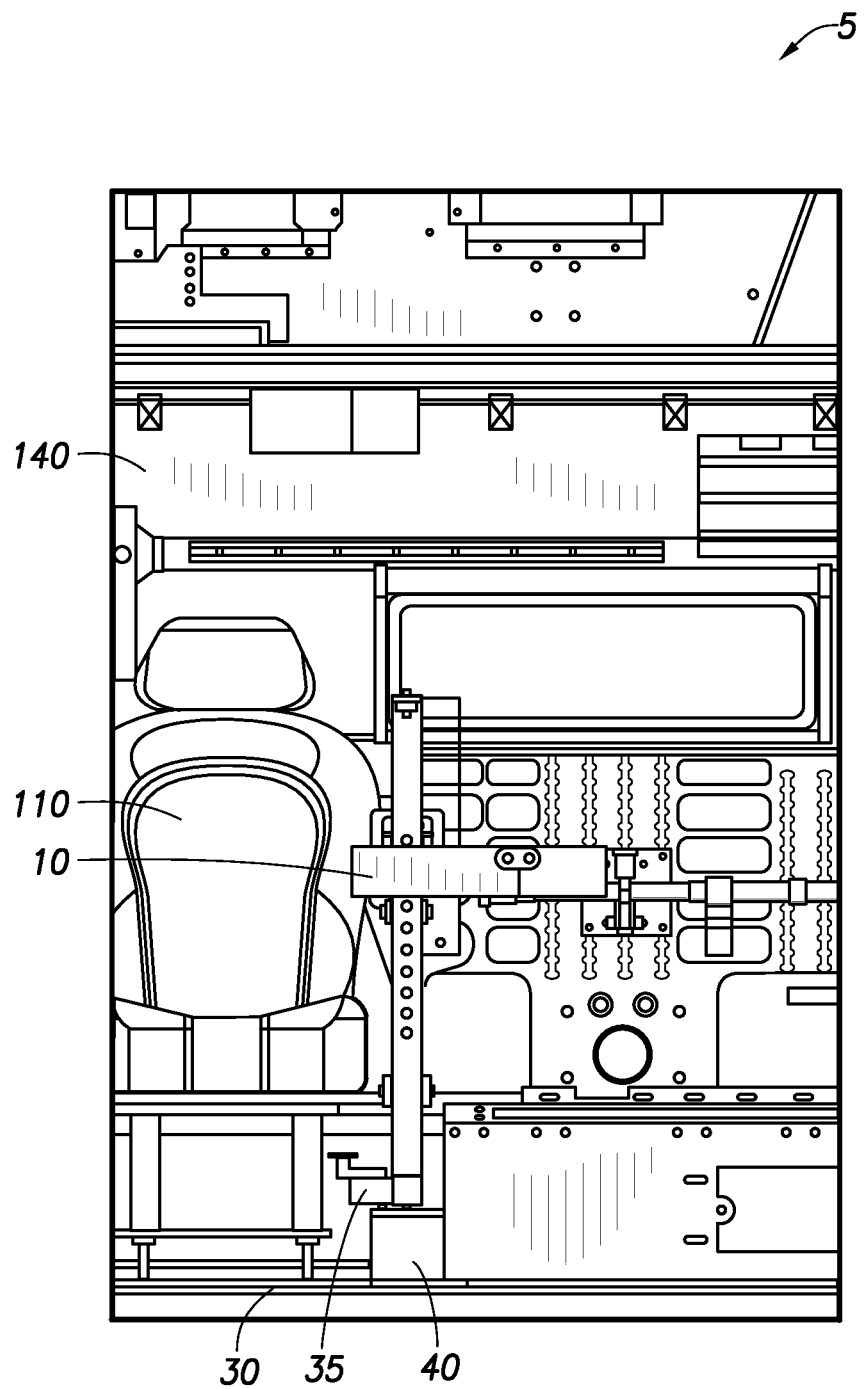
FIG. 4 illustrates a front view of an embodiment of a wall rail platform system having a collapsible platform in an upper position.
Figure 17:
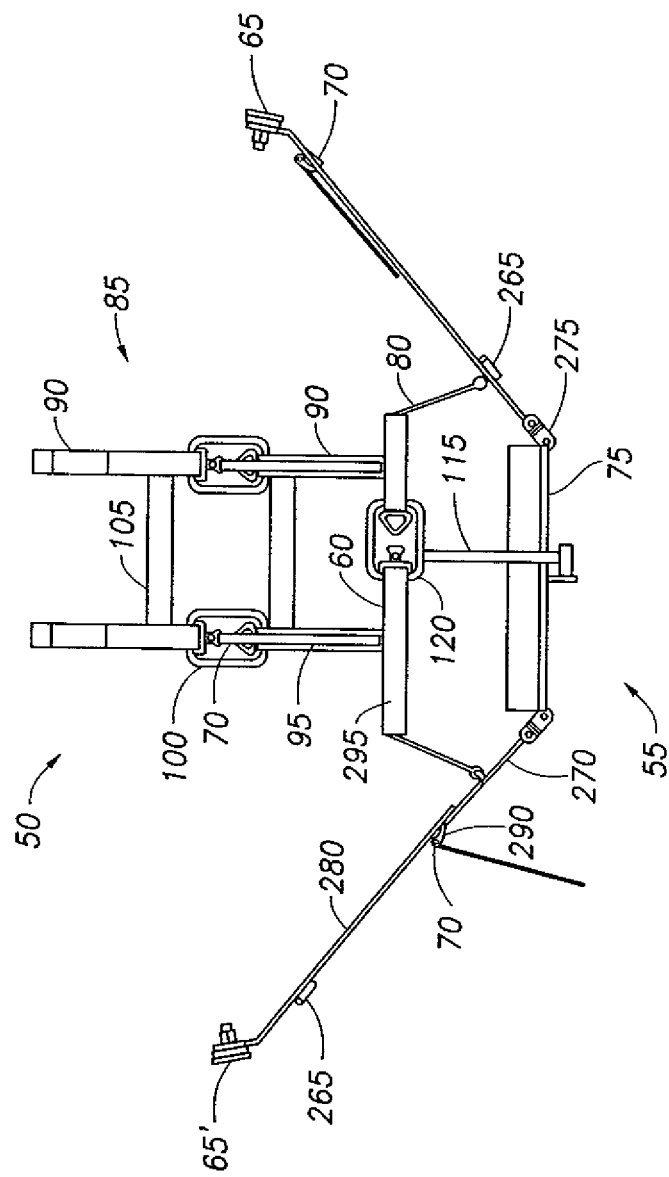
FIG. 17 illustrates a front view of an embodiment of a soldier restraint system.

FIGS. 1 and 2 illustrate an embodiment of wall rail platform system 5 having collapsible platform 10, carriage 15, rail 20, and wall mounting 25, floor mounting 30, foot pedal 35, and energy attenuation box 40. In an embodiment, collapsible platform 10 when in an un-collapsed position provides a surface for an individual (i.e., gunner) to stand upon and thereby supports the individual's weight. In embodiments, collapsible platform 10 is collapsible and laterally and vertically moveable, which, without limitation, may optimize use of available space within the vehicle. FIGS. 3 and 4 illustrate collapsible platform 10 in a lower vertical position (FIG. 3) and in an upper vertical position (FIG. 4). In some embodiments as shown in FIGS. 1 and 2, wall rail platform system 5 provides collapsible platform 10 with a means for securing the individual. In an embodiment as shown in FIG. 17, the means for securing the individual includes soldier restraint system 50.

As shown in FIGS. 1 and 2, wall rail platform system 5 has collapsible platform 10 attached to carriage 15. Carriage 15 is vertically moveable up and down to different vertical positions. Vertical movement of carriage 15 therefore also causes the corresponding vertical movement of collapsible platform 10 to desired vertical positions along rail 20. In embodiments, rail 20 is laterally rotatable, which correspondingly provides lateral rotation of carriage 15 and therefore collapsible platform 10. Collapsible platform 10 may then be rotated to a plurality of desired lateral positions.

FIGS. 1 and 2 illustrate an embodiment of wall rail platform system 5 in which collapsible platform 10 is in a collapsed position and also in a stowed position. In embodiments as shown, collapsible platform 10 is disposed at a vertical position lower than litter rack 45. In such embodiments, collapsible platform 10 is also disposed at a lateral position beneath litter rack 45.

Figure 5:
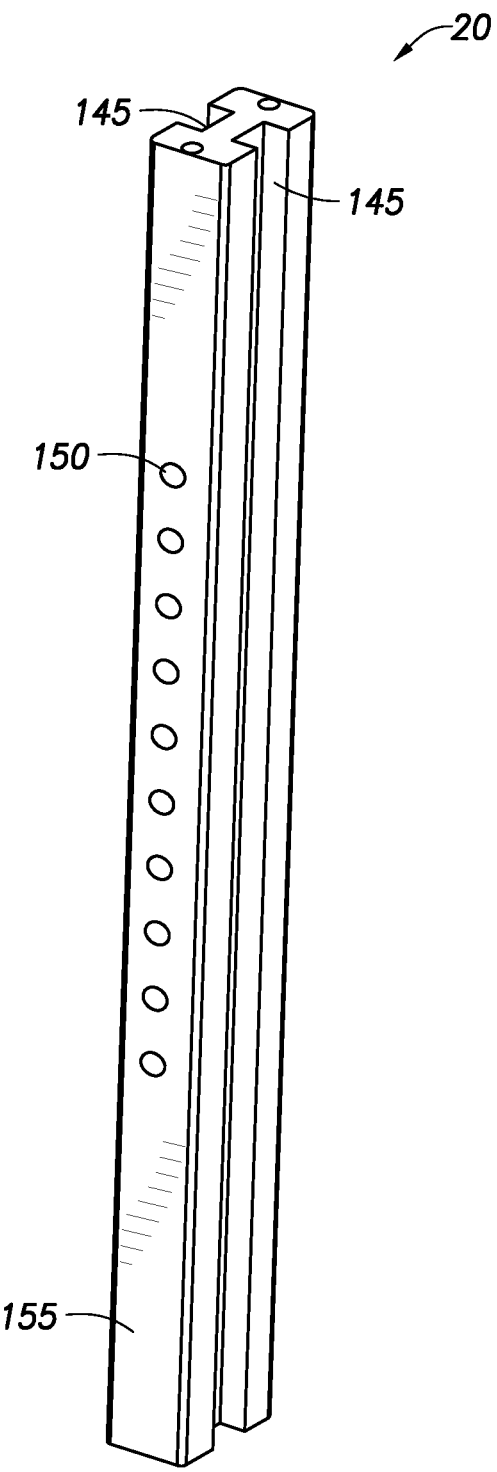
FIG. 5 illustrates a perspective view of an embodiment of a rail.

FIG. 5 illustrates an embodiment of rail 20. Rail 20 has rail body 155. Rail body 155 may be composed of any material suitable for use in a military vehicle such as metal, plastic, ceramic, or any combinations thereof. Rail 20 includes roller guides 145. In embodiments as shown, roller guides 145 are disposed on opposing sides of rail body 155. In embodiments, roller guides 145 extend lengthwise along rail body 155 and comprise a groove extending lengthwise of rail body 155. On a side of rail body 155 disposed between the sides of rail body 155 having roller guides 145, rail body 155 has mounts 150. Mounts 150 comprise recesses into rail body 155. In embodiments, mounts 150 are sufficient to allow a pin (i.e., release pins 170) to be inserted therein. In embodiments as shown, mounts 150 are disposed in a row that extends vertically.

Figure 6:
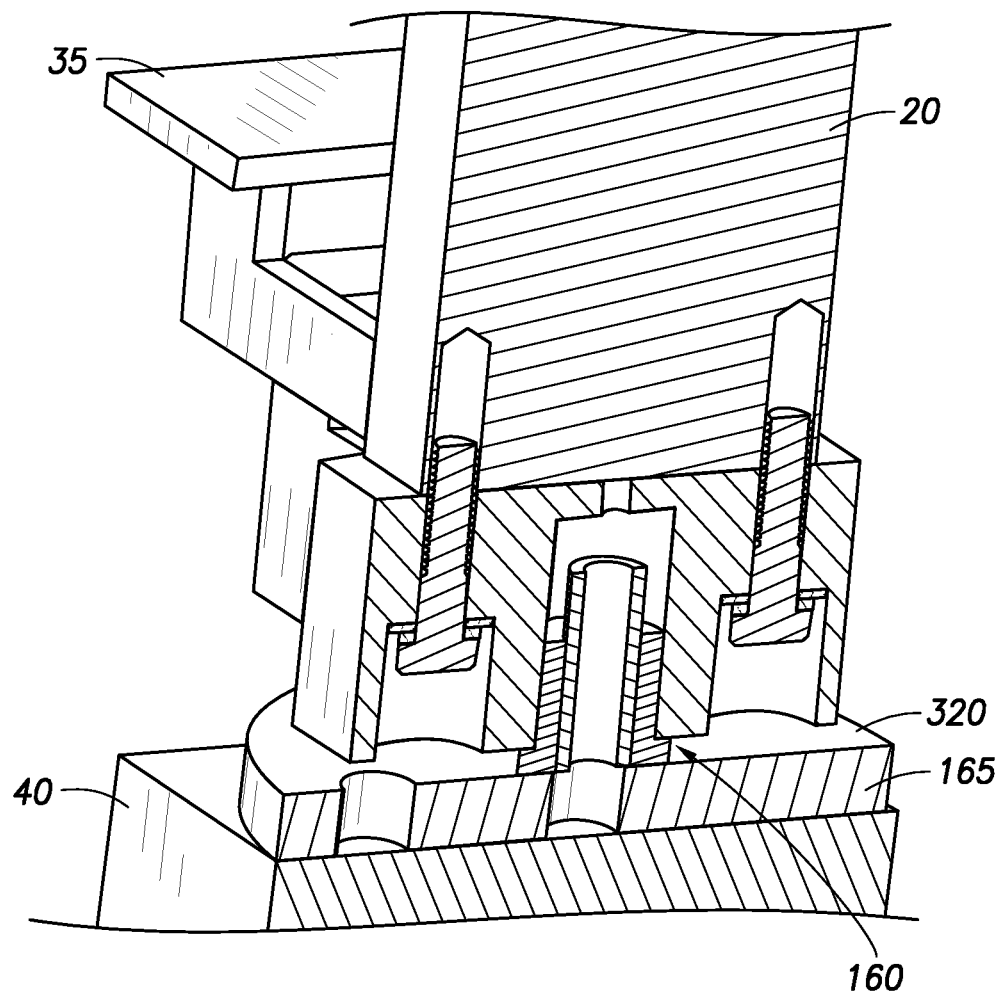
FIG. 6 illustrates a perspective cross sectional view of an embodiment of a foot pedal and rail with a bushing.
Figure 7:
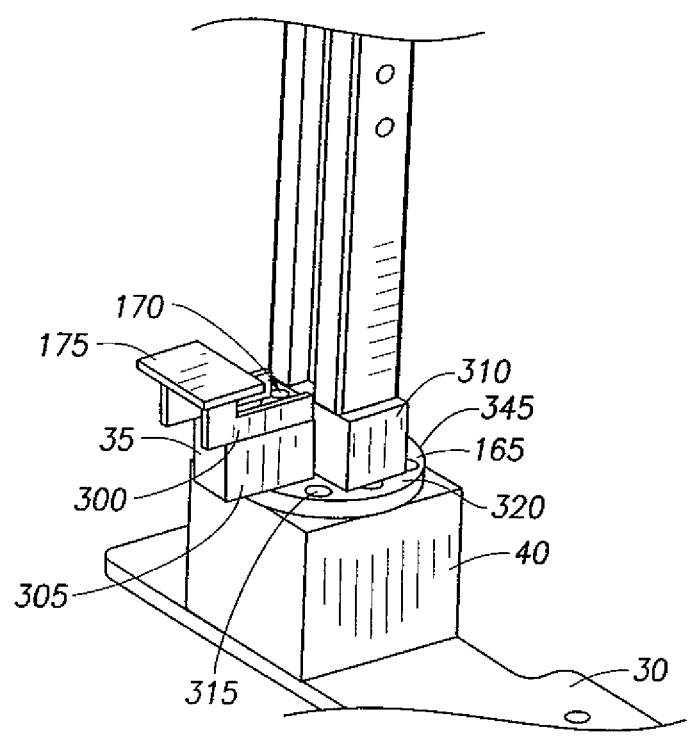
FIG. 7 illustrates a perspective view of an embodiment of a rail, foot pedal, energy attenuation box, and floor mounting.
Figure 8:
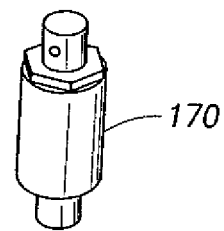
FIG. 8 illustrates a perspective view of an embodiment of a release pin.

FIG. 6 illustrates a cross sectional view of an embodiment of rail 20, foot pedal 35, and energy attenuation box 20. FIG. 7 illustrates a perspective view of an embodiment of rail 20, foot pedal 35, and energy attenuation box 40. Actuation of foot pedal 35 allows for lateral movement (i.e., rotation) of rail 20 and thereby the corresponding lateral movement (i.e., rotation) of collapsible platform 10. Foot pedal 35 has any configuration suitable for actuating rotation of collapsible platform 10. In embodiments, foot pedal 35 has release pin 170, foot contact portion 175, pedal arm 300, and pedal base 305. Release pin 170 extends through pedal arm 300. Actuation of foot pedal 35 actuates release pin 170 (i.e., lifts the release pin 170). FIG. 8 illustrates an embodiment of release pin 170. Foot contact portion 175 has a configuration suitable for receiving actuation pressure from a foot of an individual. In embodiments, foot contact portion 175 has a substantially flat horizontal surface. Foot contact portion 175 is attached to pedal arm 300, which is disposed upon pedal base 305. Pedal base 305 is disposed upon support plate 165 and attached to rail base 310. In embodiments as shown, rail 20 is attached to rail base 310. Rail base 310 is rotatable about bushing 160. In embodiments, bushing 160 is attached to support plate 165. Bushing 160 extends into an opening within rail base 310 to allow rail base 310 to rotate about bushing 160. In some embodiments, bushing 160 is self-lubricating. Support plate 165 is attached to energy attenuation box 40. In some embodiments (not illustrated), support plate 165 is attached to floor mounting 30 or the floor of the vehicle. In embodiments as shown, floor mounting 30 is secured to the floor of the vehicle. In embodiments as shown, support plate 165 has a plurality of support plate openings 315. Support plate openings 315 are openings into support plate 165 with sufficient depth and width to allow insertion of release pin 170. In embodiments as shown, support plate openings 315 are disposed circumferentially about top surface 320 of support plate 165. In embodiments, support plate openings 315 each are disposed at about the same distance inward from the edge 345 of support plate 165. Actuation of foot pedal 35 (i.e., by a foot of an individual applying pressure to foot contact portion 175) causes downward movement of the end of pedal arm 300 attached to foot contact portion 175 and upward movement of the end of pedal arm 300 through which release pin 170 extends, which lifts release pin 170 upward and out of the particular support plate opening 315 in which it is disposed. Rail 20 (and correspondingly foot pedal 35 and collapsible platform 10) may then be rotated to the desired position. The pressure applied to foot pedal 35 may then be removed, which allows upward movement of the end of pedal arm 300 attached to foot contact portion 175 and downward movement of the end of pedal arm 300 through which release pin 170 extends, which forces release pin 170 to move downward into a support plate opening 315 at the desired location thereby locking rail 20 (and correspondingly collapsible platform 10 and foot pedal 35) into place.

In embodiments as shown in FIGS. 1-4, 6, and 7, support plate 165 is attached to energy attenuation box 40 (e.g., to the top side of energy attenuation box 40). The opposing side of energy attenuation box 40 is attached to floor mounting 30. In alternative embodiments (not illustrated), energy attenuation box 40 is attached to the floor of the vehicle. Energy attenuation box 40 includes any system suitable for reducing or preventing energy applied to the bottom of wall rail platform system 5 (i.e., to the bottom of rail 20) passing to the individual standing on collapsible platform 10. For instance, a mine or improvised explosive device exploding underneath or near the military vehicle applies force to the military vehicle and thereby to rail 20 and collapsible platform 10. Energy attenuation box 40 reduces or prevents the energy from passing through to rail 20 and also to the individual standing on collapsible platform 10, thereby protecting the individual from harm. Without limitation, an example of a suitable energy attenuation system disposed in energy attenuation box 40 includes a SHOCKRIDE CRUSH BOX, commercially available from ArmorWorks Enterprises, LLC.

Figure 9:
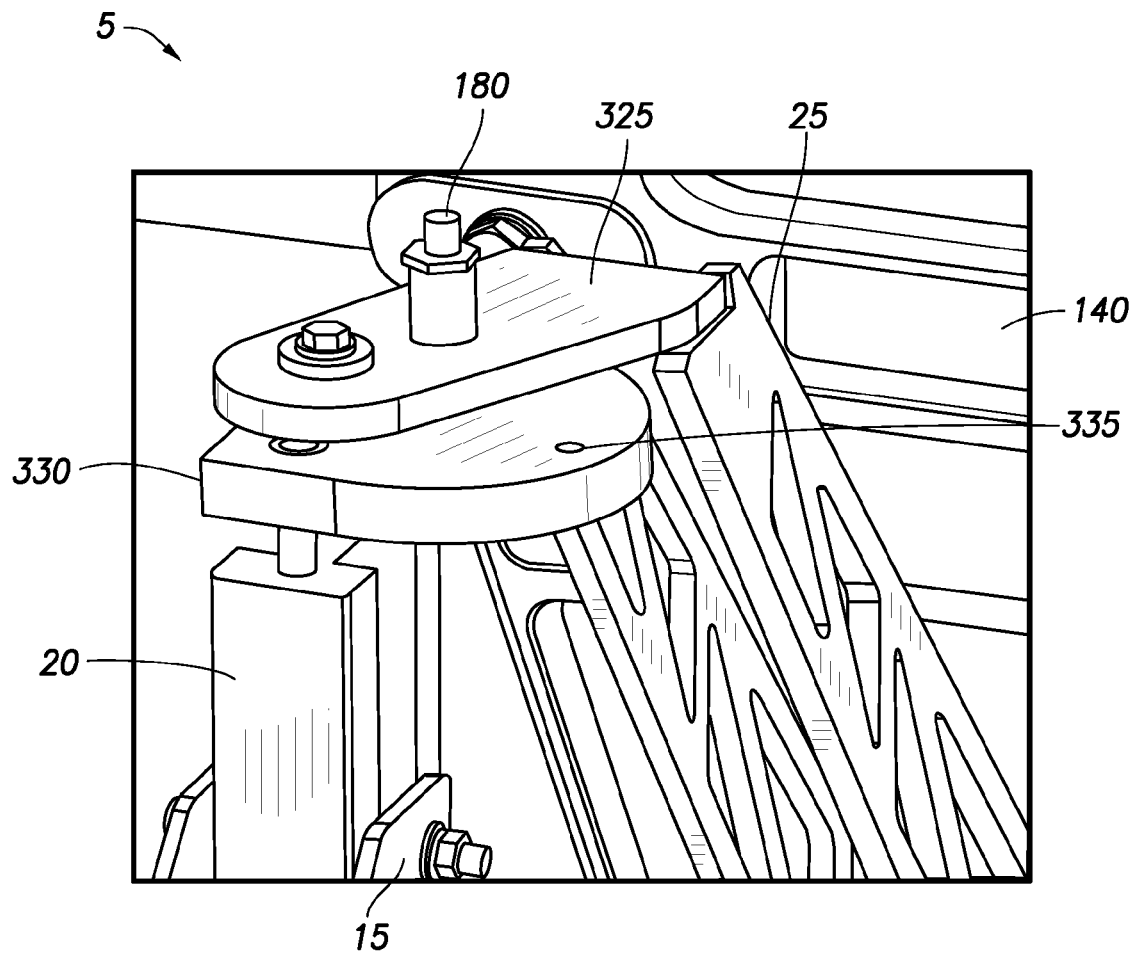
FIG. 9 illustrates a perspective view of an embodiment of a rail, wall mounting, and hand pin.

FIG. 9 illustrates an alternative embodiment of wall rail platform system 5 in which a hand pin 180 is to control rotation of rail 20 (and accordingly collapsible platform 10). In embodiments, hand pin 180 is used instead of foot pedal 35. In such embodiments as shown in FIG. 9, wall rail platform system 5 includes hand pin 180, wall mounting plate 325 and hand pin plate 330. In embodiments, wall mounting plate 325 is attached to wall mounting 25. Hand pin plate 330 is rotatably attached to wall mounting plate 325. Hand pin plate 330 is attached to rail 20. Hand pin plate 330 has a plurality of hand pin plate openings 335. Each hand pin plate opening 335 has sufficient depth and width to receive a portion of hand pin 180. Hand pin 180 is insertable through wall mounting plate 325 and into a hand pin plate opening 335. To rotate rail 20 and therefore collapsible platform 10, hand pin 180 is lifted to a position at which it is not disposed in a hand pin plate opening 335. Rail 20 is rotated to a desired position for collapsible platform 10, and hand pin is inserted through wall mounting plate 325 and into the hand pin plate opening 335 at the desired position for the collapsible platform 10. In such embodiments, rail 20 is rotatable about bushings or any other suitable means. In embodiments as shown in FIGS. 1 and 9, wall mounting 25 is secured to wall 140 of the vehicle and also to rail 20 on the opposing end of rail 20 from energy attenuation box 40.

Figure 10:
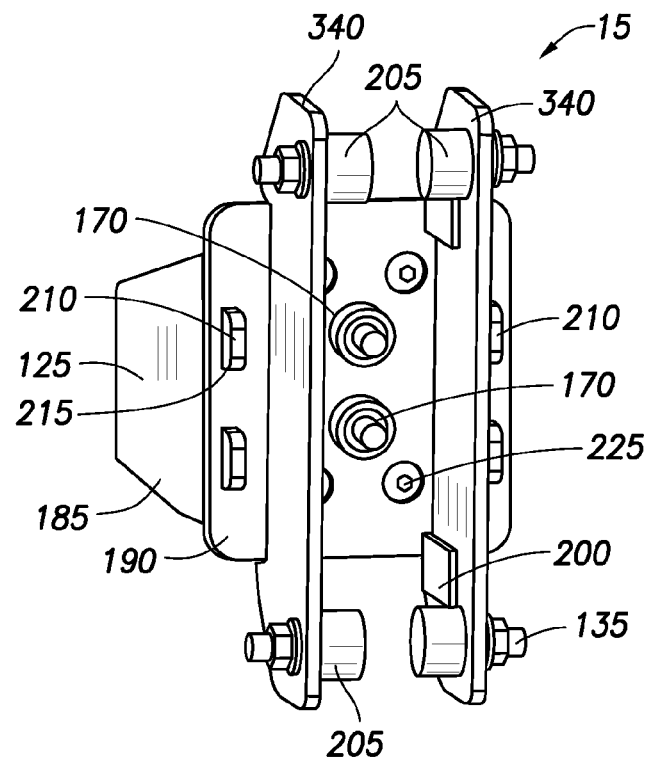
FIG. 10 illustrates a perspective back view of an embodiment of a carriage.
Figure 11:
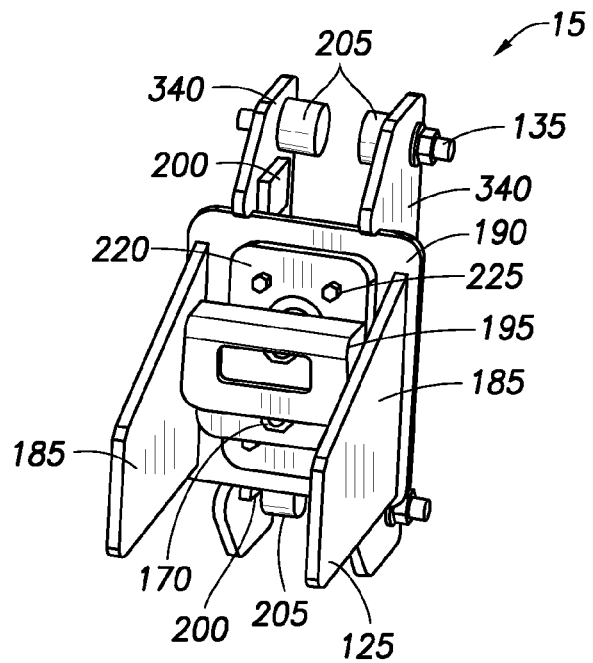
FIG. 11 illustrates a perspective front view of an embodiment of a carriage.

FIGS. 10 and 11 illustrate different views of an embodiment of carriage 15. Carriage 15 includes roller brackets 340. In embodiments, carriage 15 has two roller brackets 340 disposed about parallel to each other. Each roller bracket 340 has a roller 205 disposed on opposing longitudinal ends of the roller bracket 340 from each other. Each roller 205 is attached to a roller bracket 340 by roller attachment means 135. Roller attachment means 135 may be any suitable attachment means such as a bolt, washer, and nut. In embodiments as shown, each roller 205 is disposed about parallel to another roller 205 on the opposing roller bracket 340. Rollers 205 are any suitable rotatable device sufficient to allow carriage 15 to move vertically along rail 20. In embodiments, each roller 205 is disposed on an opposing roller guide 145 from another roller 205. The rollers 205 are rollable within roller guide 145 to allow vertical movement of carriage 15 along rail 20 (i.e., to allow carriage 15 to slide up and down along rail 20). Rail 20 is disposed between the two roller brackets 340. In some embodiments, carriage 15 has slider pads 200 disposed on the side of roller bracket 340 proximate rail 20. Carriage 15 also includes platform bracket 125 that includes platform bracket base 190. Roller brackets 340 are attached to platform bracket base 190. Platform bracket base 190 is attached to pull handle base 220 by pull handle base attachment means 225. Pull handle base attachment means 225 may be any suitable attachment means. In embodiments, pull handle base attachment means 225 comprises screws or bolts. Platform bracket 125 also includes platform bracket arms 185. Platform bracket base 190 is attached to platform bracket arms 185, which are attached to collapsible platform 10. Collapsible platform is attached to platform bracket arms 185 by any suitable means. In embodiments, platform bracket arms 185 are about parallel to each other. Platform bracket arms 185 are attached to platform bracket base 190 by any suitable means. In embodiments, platform bracket arms 185 are attached to platform bracket base 190 by press fit. Embodiments include each platform bracket arm 182 having platform bracket arm extensions 210, which are insertable by press fit through platform bracket brace openings 215 of platform bracket base 190. Carriage 15 also includes pull handle 195. Pull handle 195 has release pins 170 that extend through pull handle 195. In alternative embodiments (not shown), carriage 15 may have one release pin 170 or more than two release pins 170. Release pins 170 are also extendable through platform bracket base 190 and pull handle base 220 as well as through mounts 150. Pull handle base 220 is attached to platform bracket base 190. Pressure applied by an individual to pull handle 195 away from platform bracket base 190 also pulls release pins 170 out of mounts 150, which allows vertical movement (i.e., slide) up or down of carriage 15 along rail 20 and correspondingly causes movement of collapsible platform 10. Collapsible platform 10 may be then be moved to the desired vertical position, and pull handle 195 may then be pressed back in the direction of platform bracket base 190, which then pushes release pins 170 into the mounts 150 at the desired vertical position.

Figure 12:
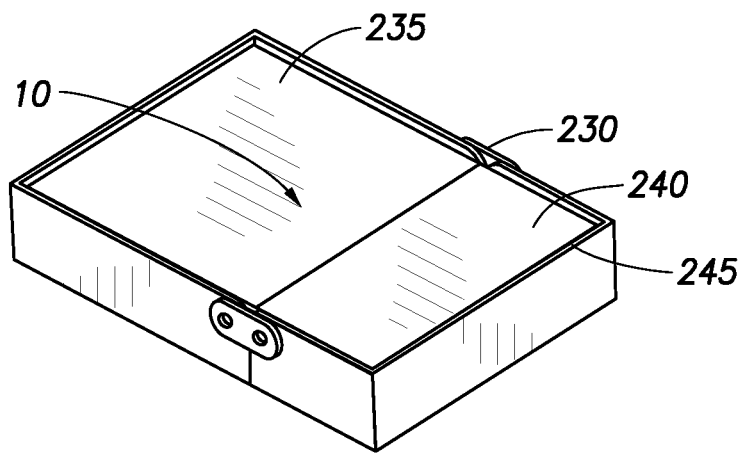
FIG. 12 illustrates a top perspective view of an embodiment of a collapsible platform when not collapsed.
Figure 13:
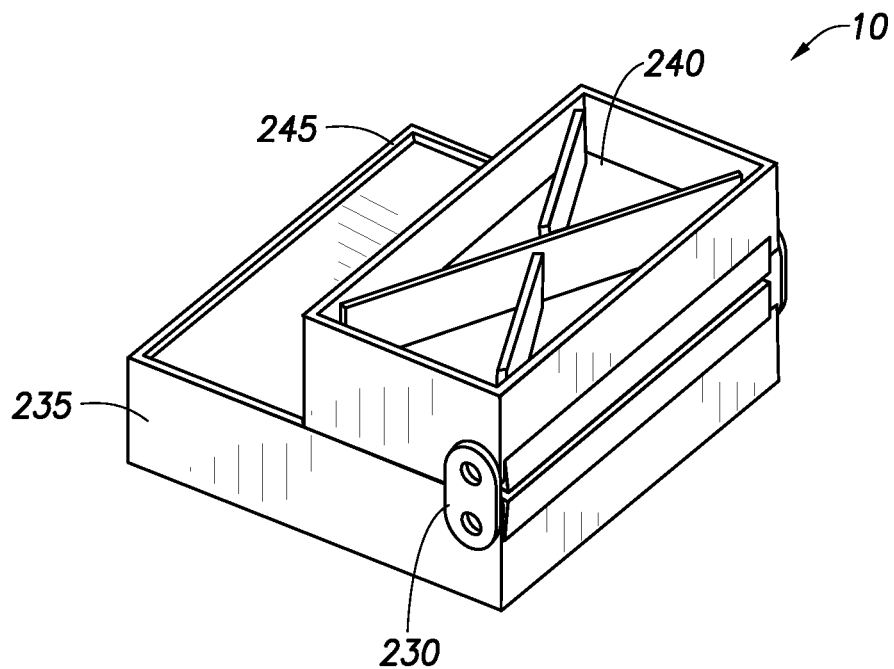
FIG. 13 illustrates a top perspective view of an embodiment of a collapsible platform in an un-collapsed position.

FIG. 12 illustrates an embodiment of collapsible platform 10 in an un-collapsed position. At such position, an individual may stand upon collapsible platform 10. Collapsible platform 10 comprises base portion 235 and collapsible base portion 240, which are attached to each other by collapsible platform brackets 230. A pin or pins (not illustrated) may be inserted through collapsible platform brackets 230 to secure collapsible platform 10 in the collapsed or un-collapsed position. In the un-collapsed position of FIG. 12, base portion 235 and collapsible base portion 240 provide about a parallel surface of collapsible platform 10 upon which an individual may stand. In the collapsed position of FIG. 13, collapsible base portion 240 is disposed upon base portion 235. In embodiments, collapsible platform 10 has base raised edge 245, which is a raised edge extending about the circumference of the top side of collapsible platform 10 when in the un-collapsed position.

It is to be understood that rail 20 is shown disposed between litter rack 45 and chair 110 for illustrative purposes only and may be disposed at other locations in the vehicle. In embodiments of the stowed position of collapsible platform 10, collapsible platform 10 extends into the interior of the vehicle laterally about the same distance or less than chair 110.

Figure 14:
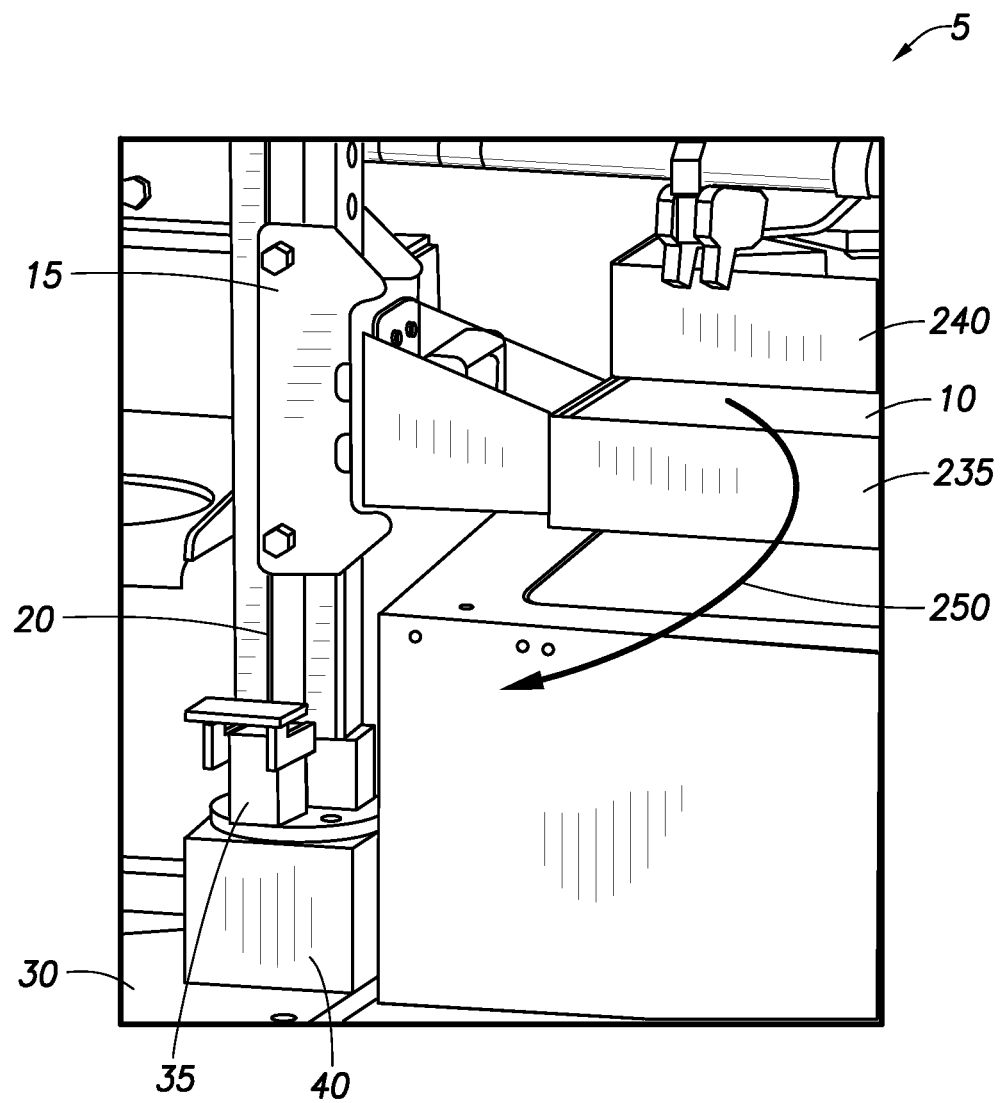
FIG. 14 illustrates a perspective view of an embodiment of a collapsible platform in a collapsed position when laterally rotated.
Figure 15:
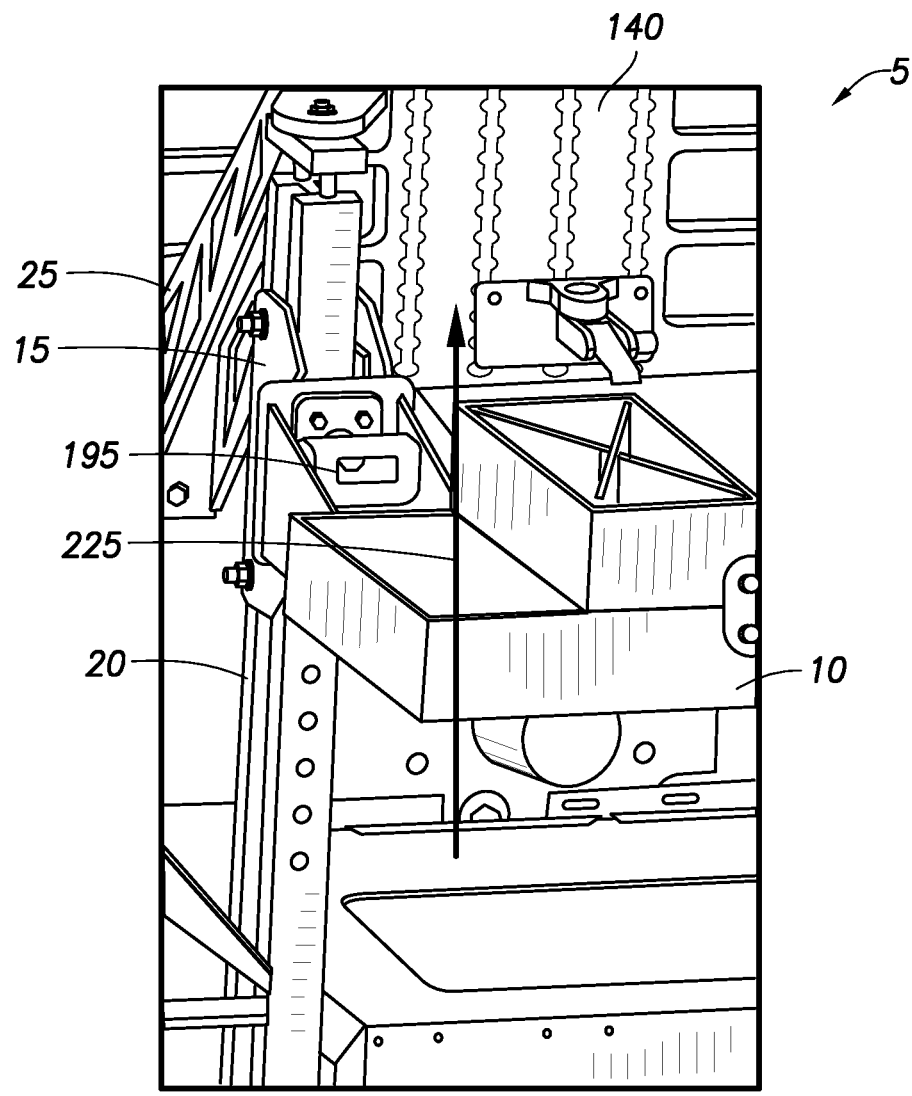
FIG. 15 illustrates a perspective view of an embodiment of a collapsible platform in a collapsed position when vertically rotated.
Figure 16:
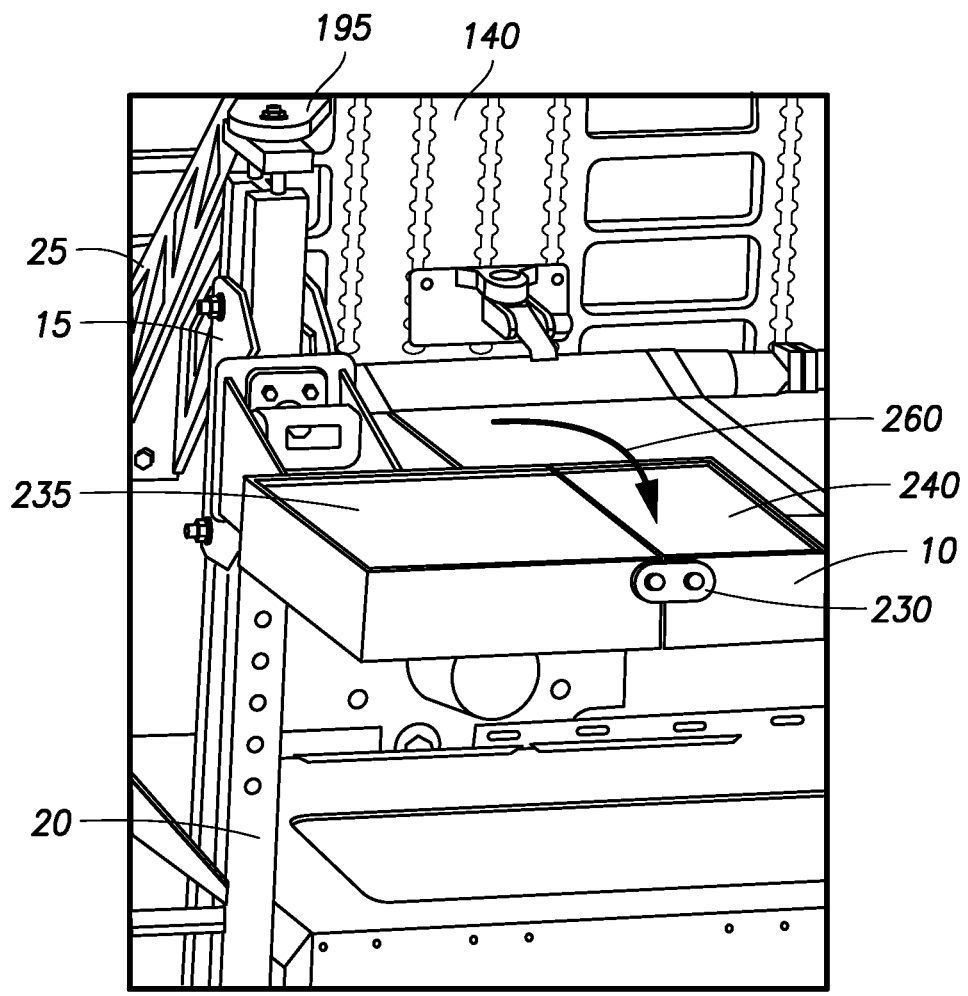
FIG. 16 illustrates a perspective view of an embodiment of a collapsible platform in an un-collapsed position.

FIGS. 14-16 illustrate movement of collapsible platform 10 in wall rail platform system 5. In FIG. 14, collapsible platform 10 is shown in a stowed position and in the collapsed position. To move collapsible platform 10, pressure is applied to foot pedal 35 (i.e., to depress foot contact portion 175) and allow rotation of rail 20 and collapsible platform 10. Arrow 250 is for illustration purposes only and shows the rotational movement of collapsible platform 10. In FIG. 15, the pressure has been removed from foot pedal 35 to secure collapsible platform 10 in the desired lateral position. Pull handle 195 has been pulled out allowing collapsible platform 10 to be moved to the desired vertical position. Arrow 225 is for illustration purposes only and shows the direction of vertical movement of collapsible platform 10. In FIG. 16, pull handle 195 is released to secure collapsible platform 10 in the desired vertical position. The pins are removed from collapsible platform brackets 230 to allow collapsible base portion 240 to be moved into the un-collapsed position. The pins may then be re-inserted through collapsible platform brackets 230 to secure collapsible platform 10 in the un-collapsed position. Arrow 260 is for illustration purposes only and shows the direction of movement of collapsible base portion 240 from the collapsed position to the un-collapsed position.

FIG. 17 illustrates an embodiment of a soldier restraint system 50 that includes seat assembly 55 and restraint harness belt 60. Seat assembly 55 includes seat 75. Seat 75 may include any type of seat suitable for use in a vehicle. Seat 75 may also be composed of any material suitable for use in a vehicle. Without limitation, seat 75 may be composed of leather, plastic, nylon, and the like. In some embodiments, seat 75 includes a cushion. Seat 75 may have any configuration suitable for an individual (i.e., soldier) to sit upon. As illustrated, straps 270 are attached to seat 75. Straps 270 are attached to seat 75 by strap attachment means 275. Strap attachment means 275 include any means suitable for attaching straps 270 to seat 75. In embodiments as illustrated in FIG. 17, strap attachment means 275 are brackets that allow straps 270 and seat 75 to swivel in relation to each other. Straps 270 may be composed of any material suitable for use in a vehicle such as nylon, leather, and the like. In some embodiments, straps 270 are suitably attached on opposing sides of seat 75 to provide balance to an individual sitting in seat 75. In embodiments as illustrated in FIG. 17, two straps 270 are attached to seat 75. In alternative embodiments (not illustrated), more than two straps 270 are attached to seat 75. Mounting assemblies 65, 65' attach soldier restraint system 50 to the interior of the vehicle.

In an embodiment as illustrated in FIG. 17, mounting assemblies 65, 65' are secured inside the vehicle. In some embodiments, mounting assemblies 65, 65' are secured to inside surfaces such as walls of the vehicle (i.e., vehicle wall 140) or a gun turret of the vehicle. FIG. 17 illustrates an embodiment of soldier restraint system 50 having mounting assemblies 65, 65' on opposing sides of seat 75. In embodiments as illustrated in FIG. 17, one mounting assembly 65 has an attached release assembly 70. The attached release assembly 70 is attached to a strap 270 that attaches mounting assembly 65 to seat 75. Strap 270 may be secured to seat 75 by any suitable means. In an embodiment as illustrated, strap 270 is secured to seat 75 by strap attachment means 275. Strap attachment means 275 includes any means suitable for attaching a strap to a seat. In an embodiment as shown, strap attachment means 275 is a bracket that swivels. Without limitation, a bracket that swivels allows limited motion of seat 75. In some embodiments, strap 270 includes adjusting means 265. Adjusting means 265 is any means suitable for adjusting the length of strap 270 between release assembly 70 and seat 75. The other mounting assembly 65' has an attached mounting strap 280 with a release assembly 70 attached on the opposing end of mounting strap 280 from mounting assembly 65'. In some embodiments, mounting strap includes adjusting means 265. FIG. 17 illustrates an embodiment of soldier restraint system 50 that has two mounting assemblies 65, 65' but it is to be understood that soldier restraint system is not limited to two mounting assemblies 65, 65' but in alternative embodiments (not illustrated) may have more than two mounting assemblies. Mounting assemblies 65, 65' are secured in the vehicle at a sufficient height to suspend seat 75 at a desirable height in the vehicle (i.e., from collapsible platform 10). Adjusting means 265 allow the length of straps 270 to be adjusted to adjust the suspension height of seat 75. Straps 270 attach seat 75 to release assemblies 70 by attachment means 290. Attachment means 290 may include any suitable means for attaching a strap to an object such as a hook, bracket, latch, and the like. Straps 270 have a sufficient tension to facilitate suspension of seat 75 but in some embodiments also have a sufficient tension to allow the individual to have a desirable amount of movement while secured in seat 75. For instance, in an embodiment in which soldier restraint system 50 is secured in the vehicle to allow the individual to sit in the vehicle, the soldier may have a desire to move about on collapsible platform 10 (i.e., when in an un-collapsed position). Mounting assemblies 65, 65' may be secured in the vehicle at any degrees apart to provide a seat 75 of sufficient stability to allow an individual to sit in seat 75.

FIG. 17 illustrates an embodiment of soldier restraint system 50 in which one mounting assembly 65 has a release assembly 70 attached to the mounting assembly 65, and the other mounting assembly 65' has a release assembly 70 attached with a mounting strap 280 attached in between the mounting assembly 65' and the release assembly 70. Without limitation, the mounting assembly 65 has the release assembly 70 attached to provide a release assembly 70 at a sufficient proximity to the individual sitting in seat 75 to allow the individual to pull the release assembly 70 and quickly drop seat 75. Further, without limitation, the mounting assembly 65' has the release assembly at a lower position in relation to seat 75 to provide a release assembly 70 at a sufficient proximity to other individuals in the vehicle to pull the release assembly 70 and quickly drop seat 75. It is to be understood that soldier restraint system 50 is not limited to release assembly 70 attached to one mounting assembly 65 and another release assembly 70 disposed at a lower position in relation to seat 75. Soldier restraint system 50 may have release assemblies 70 disposed at any position in relation to seat 75. In an alternative embodiment (not illustrated), a mounting assembly 65 and/or 65' may have one release assembly 70 attached to the respective mounting assembly and at least one other release assembly 70 disposed between the one release assembly 70 and seat 75. In other alternative embodiments (not illustrated), both mounting assemblies 65, 65' have a release assembly 70 attached to the respective mounting assembly 65, 65'. In some alternative embodiments (not illustrated), both mounting assemblies 65, 65' have an attached release assembly 70 with a mounting strap 280 disposed between the respective mounting assembly and the release assembly 70. It is to be understood that when one release assembly is pulled to release seat 75 from the respective mounting assembly 65 or 65', seat remains secured to the other mounting assembly 65 or 65'.

FIG. 17 further illustrates an embodiment of soldier restraint system 50 in which shoulder harness 85 is attached to restraint harness belt 60. Shoulder harness 85 includes shoulder harness straps 90. In an embodiment as illustrated, shoulder harness 85 has two shoulder harness straps 90 that are each attached to the front side 295 and back side (not shown) of restraint harness belt 60. Each shoulder harness strap 90 passes over the shoulder of the individual. Shoulder harness straps 90 have a tension sufficient to secure the individual within soldier restraint system 50 but that also allows the individual to conduct desired tasks. In some embodiments, the width between shoulder harness straps 90 is adjustable. Without limitation, adjusting the width between shoulder harness straps 90 allows the shoulder width of different individuals to be taken into account. The width may be adjusted by any suitable means. It is to be understood that shoulder harness 85 is not limited to two shoulder harness traps 90 but in alternative embodiments (not illustrated) may also include more than two shoulder harness straps 90. In embodiments as illustrated, shoulder harness straps 90 each have a release assembly 70. In an embodiment, the release assemblies 70 have release straps 95. In some embodiments, the release assemblies 70 are located in the front of shoulder harness straps 90. Without limitation, locating the release assemblies 70 in the front of shoulder harness straps 90 allows the individual to release the shoulder harness 85, with the release straps 95 allowing a quick release. In alternative embodiments (not illustrated), only one of the shoulder harness straps 90 has a release assembly 70. In some embodiments as illustrated, shoulder harness straps 90 have buckle pads 100, which are disposed between the individual and release assembly 70. Buckle pads 100 may have any configuration and size suitable for providing a cushion between the individual and release assembly 70 when secured to each other. In some embodiments, shoulder harness 85 also includes back supports 105. Shoulder harness 85 may have any desirable number of back supports 105. In embodiments as illustrated, shoulder harness 85 has a back support 105 in an upper region of shoulder harness 85 and a back support 105 in a lower region of shoulder harness 85. Without limitation, such locations of back supports 105 provide support for the upper and lower back of the individual. Back supports 105 may be composed of any suitable material. It is to be understood that solider restraint system 50 is not limited to the embodiments shown for FIG. 17 but may also include other embodiments as disclosed in U.S. Pat. No. 8,132,838 issued Mar. 13, 2012 and U.S. application Ser. No. 13/631,976 filed Sep. 29, 2012, which are both incorporated by reference in their entirety.

The vehicle in which wall rail platform system 5 is disposed may include any vehicle such as a truck, car, military vehicle, helicopter, air plane, and the like. In an embodiment, the vehicle is a military vehicle. Any type of military vehicle may be used. In embodiments, the military vehicle is an ambulance.

It is to be understood that wall rail platform system 5 is not limited to soldiers but may be used for any type of individual.

Although the present invention and its advantages have been described in detail, it should be understood that various changes, substitutions and alterations may be made herein without departing from the spirit and scope of the invention as defined by the appended claims.

What is claimed is:

1. A wall rail platform system disposed in a vehicle, comprising:
   a collapsible platform, wherein the collapsible platform comprises a position, and wherein the position comprises a collapsed position or an un-collapsed position;
   a rail, wherein the rail comprises roller guides, wherein the roller guides are disposed on opposing sides of the rail, and wherein the rail rotates about the rail's vertical axis; and
   a carriage, wherein the carriage comprises a plurality of rollers, wherein the plurality of rollers are disposed in the roller guides, wherein the carriage is attached to the collapsible platform, and wherein the carriage is vertically moveable along the rail.

2. The wall rail platform system of claim 1, further comprising an energy attenuation box.

3. The wall rail platform system of claim 1, further comprising a soldier restraint system.

4. The wall rail platform system of claim 3, wherein the soldier restraint system comprises a seat assembly and a restraint harness belt.

5. The wall rail platform system of claim 1, further comprising a hand pin.

6. The wall rail platform system of claim 5, wherein actuation of the hand pin allows for lateral movement of the rail, collapsible platform, and the carriage.

7. The wall rail platform system of claim 1, wherein the carriage is vertically moveable up and down along the rail.

8. The wall rail platform system of claim 7, wherein the carriage comprises a pull handle, and wherein actuation of the pull handle allows for vertical movement of the carriage along the rail.

9. The wall rail platform system of claim 8, wherein the carriage is securable to the rail at a plurality of vertical positions.

10. The wall rail platform system of claim 1, wherein the collapsible platform comprises a base portion and a collapsible base portion.

11. The wall rail platform system of claim 10, wherein the base portion and the collapsible base portion are attached to each other.

12. The wall rail platform system of claim 10, wherein the collapsible base portion is disposed upon the base portion when the collapsible platform is in the collapsed position.

13. The wall rail platform system of claim 10, wherein the un-collapsed position comprises the base portion and the collapsible base portion, wherein the base portion and the collapsible base portion create a horizontal surface.

14. The wall rail platform system of claim 1, further comprising a foot pedal.

15. The wall rail platform system of claim 14, wherein actuation of the foot pedal allows for rotation of the rail.

16. The wall rail platform system of claim 14, further comprising a support plate, wherein the rail is disposed upon the support plate.

17. The wall rail platform system of claim 16, wherein the support plate comprises a plurality of support plate openings.

* * * * *